United States Patent
Zhang

(10) Patent No.: US 7,495,850 B2
(45) Date of Patent: Feb. 24, 2009

(54) LENS MODULE AND METHOD FOR MANUFACTURING THE SAME

(75) Inventor: Hui Zhang, Shenzhen (CN)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 0 days.

(21) Appl. No.: 11/757,910

(22) Filed: Jun. 4, 2007

(65) Prior Publication Data

US 2008/0055747 A1    Mar. 6, 2008

(30) Foreign Application Priority Data

Sep. 1, 2006    (CN) .................... 2006 1 0062442

(51) Int. Cl.
*G02B 7/02* (2006.01)
*B29D 11/00* (2006.01)

(52) U.S. Cl. .................... 359/819; 264/1.1; 264/1.7

(58) Field of Classification Search ............. 359/811, 359/819, 205, 212, 216, 727, 797; 264/1.1, 264/1.7, 1.32, 2.2, 2.4, 2.5; 396/385; 65/60.1; 353/100, 101; 250/376

See application file for complete search history.

(56) References Cited

U.S. PATENT DOCUMENTS

| | | | | |
|---|---|---|---|---|
| 4,311,364 A | * | 1/1982 | Motomura et al. | 359/892 |
| 4,921,205 A | * | 5/1990 | Drew et al. | 249/61 |
| 5,246,634 A | * | 9/1993 | Ichikawa et al. | 264/1.7 |
| 5,353,165 A | * | 10/1994 | VanDeMoere et al. | 359/819 |
| 5,494,615 A | * | 2/1996 | Wang Lee | 264/1.7 |
| 5,719,711 A | * | 2/1998 | Shiba | 359/819 |
| 5,851,255 A | * | 12/1998 | Ohtsuki et al. | 65/60.1 |
| 6,299,882 B1 | * | 10/2001 | Junker | 424/199.1 |
| 6,615,409 B2 | * | 9/2003 | Youmans et al. | 2/432 |
| 6,657,761 B2 | * | 12/2003 | Suzuki et al. | 359/205 |
| 6,862,123 B2 | * | 3/2005 | Suzuki et al. | 359/205 |

* cited by examiner

*Primary Examiner*—Loha Ben
(74) *Attorney, Agent, or Firm*—Steven M. Reiss

(57) ABSTRACT

A method for manufacturing a lens module (100) is provided. The lens module includes a flash lamp lens (20) and a holder (10) integrally formed/molded with the lens. The method includes at least three steps. The first step S1 is to mold the lens by means of injecting a first molding material into a provided mold assembly. The second step S2 is to mold the holder integrally with the molded lens by means of injecting a second molding material into the mold assembly to thereby yield the lens module. The third step S3 is to extract the lens module from the mold assembly.

9 Claims, 3 Drawing Sheets

LENS MODULE AND METHOD FOR MANUFACTURING THE SAME

BACKGROUND OF THE INVENTION

1. Field of the Invention

The present invention relates to a method for manufacturing a lens module and, particularly, to a method for manufacturing lens modules, which includes a holder and a lens integrally formed with the holder.

2. Description of Related Art

A lens module is generally indispensable for portable electronic devices, such as digital cameras, mobile phones, or personal digital assistants, which incorporate an imaging function (e.g., still and/or video photography). A typical lens module includes a camera lens and a holder. To facilitate better imaging, the lens module advantageously further includes a flash lamp lens. The flash lamp lens is assembled with the portable electronic device and is positioned apart from the camera lens. The arrangement of the lens module, particularly with the flash lamp lens being positioned away from the camera lens, limits the extent to which the portable electronic device can be miniaturized and thus also restricting portability.

Therefore, to solve this problem, the flash lamp lens and the holder can be manufactured or assembled as part of a whole unit. A technology, such as, for example, adhering/gluing technology, is used to mount/attach the flash lamp lens to the holder. However, the glued/adhered lens module can often easily become separated for lack of sufficient connecting strength therebetween. Alternatively, welding technology (e.g., plastic welding) can be used to fix the flash lamp lens together with the holder. However, the welding trace between the flash lamp lens and the holder cannot be shielded by the flash lamp lens and thus is still visible. The welding process is also time-consuming and expensive.

Therefore, a heretofore-unaddressed need exists in the art to address the aforementioned deficiencies and inadequacies.

SUMMARY OF THE INVENTION

In one aspect, a method for manufacturing a lens module is provided. The lens module includes a lens and a holder integrally formed with the lens. The method includes at least three steps. The first step is to mold the lens by means of injecting a first molding material into a provided mold assembly. The second step is to mold the holder integrally with the molded lens by means of injecting a second molding material into the mold assembly. The third step is to extract the lens module from the mold assembly.

In another aspect, the lens module, manufactured by implementing the aforementioned method, is provided.

BRIEF DESCRIPTION OF THE DRAWINGS

Many aspects of the lens module and the method for manufacturing the same can be better understood with reference to the following drawings. These drawings are not necessarily drawn to scale, the emphasis instead being placed upon clearly illustrating the principles of the present lens module and the method for manufacturing the same. Moreover, in the drawings like reference numerals designate corresponding parts throughout the several views. Wherever possible, the same reference numbers are used throughout the drawings to refer to the same or like elements of an embodiment.

DETAILED DESCRIPTION OF PREFERRED EMBODIMENTS

Figure 1:
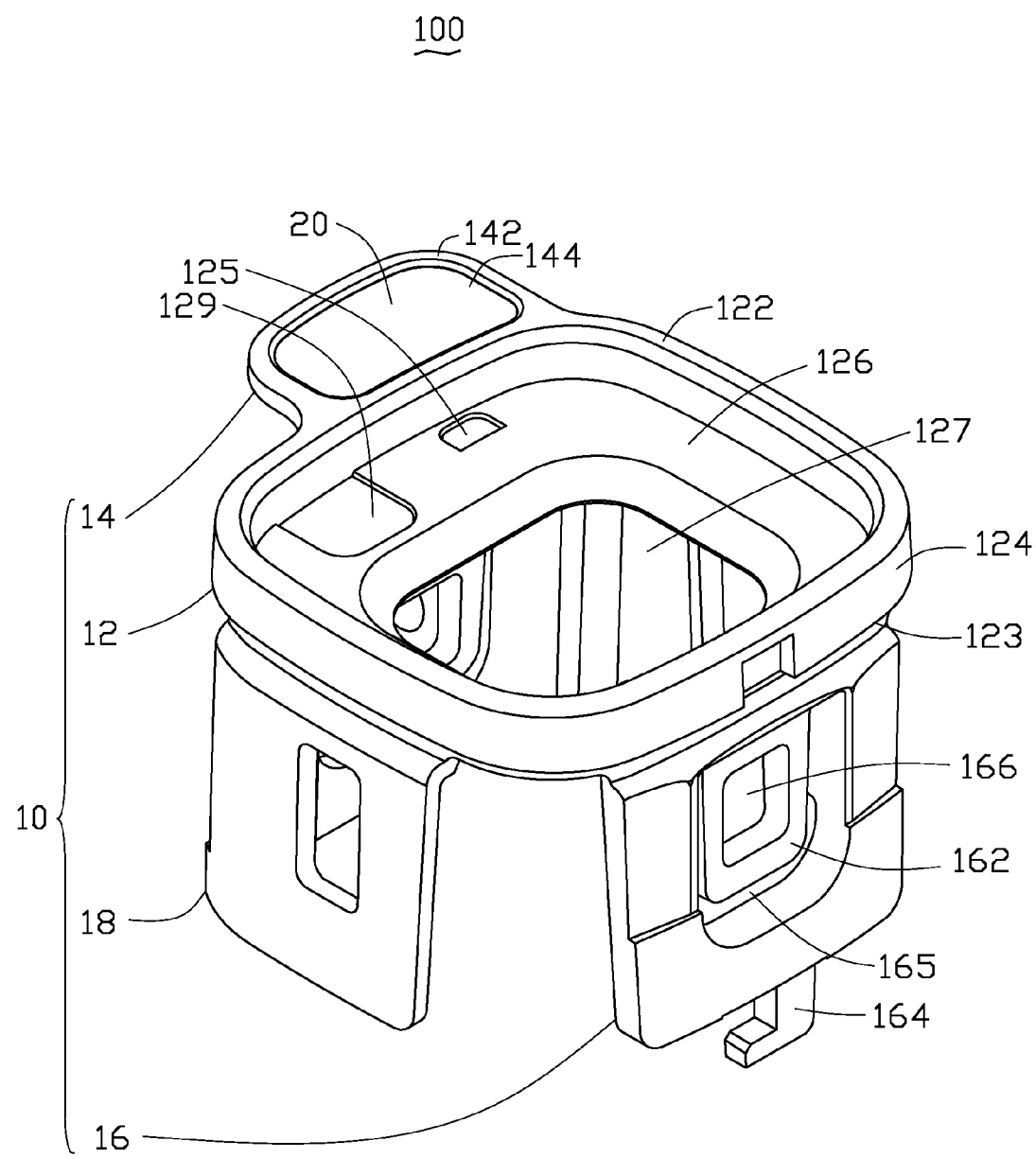
FIG. 1 is an isometric view of one aspect of a lens module, in accordance with a present embodiment.
Figure 2:
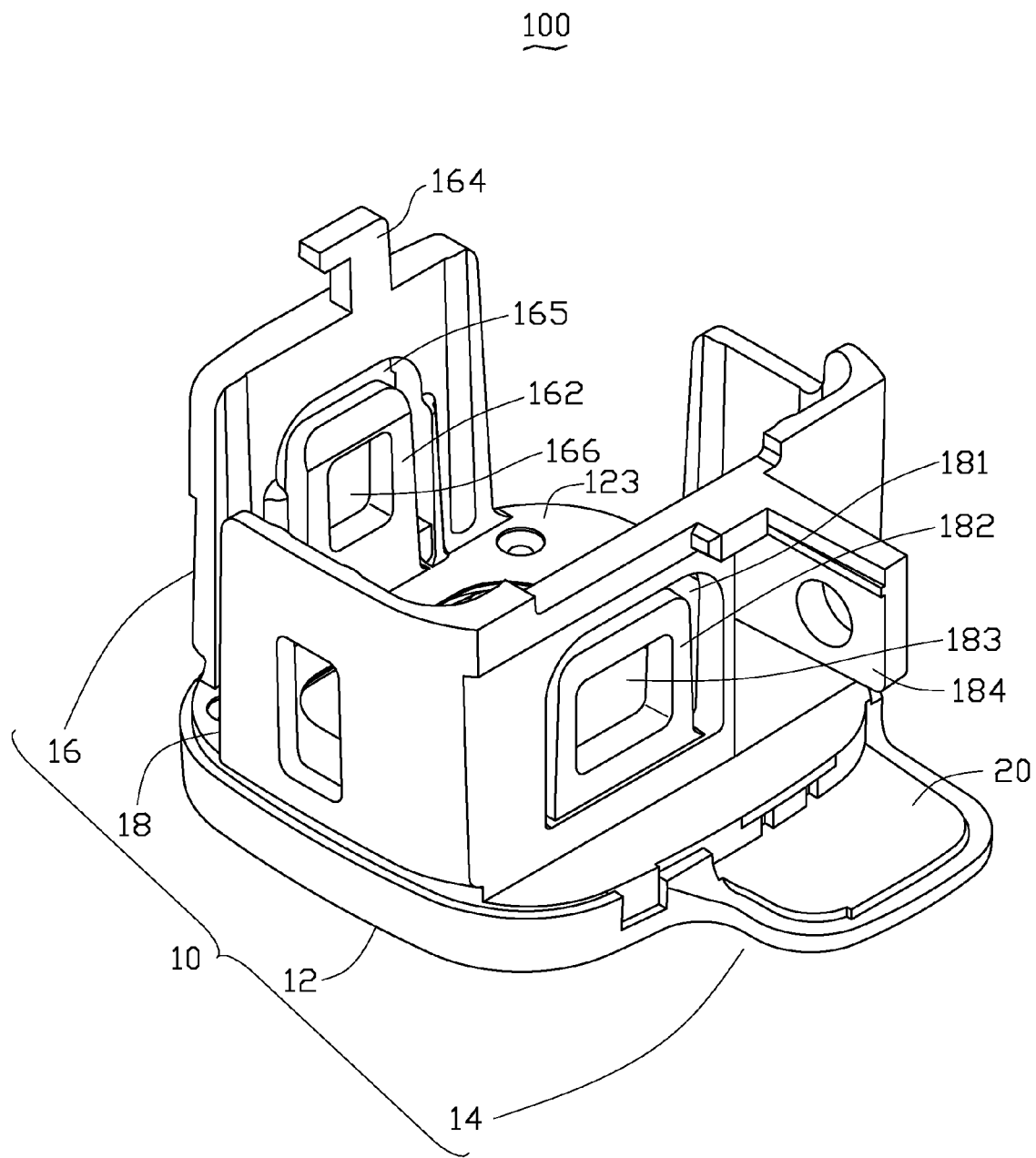
FIG. 2 is another isometric view of another aspect of the lens module shown in FIG. 1.
Figure 3:
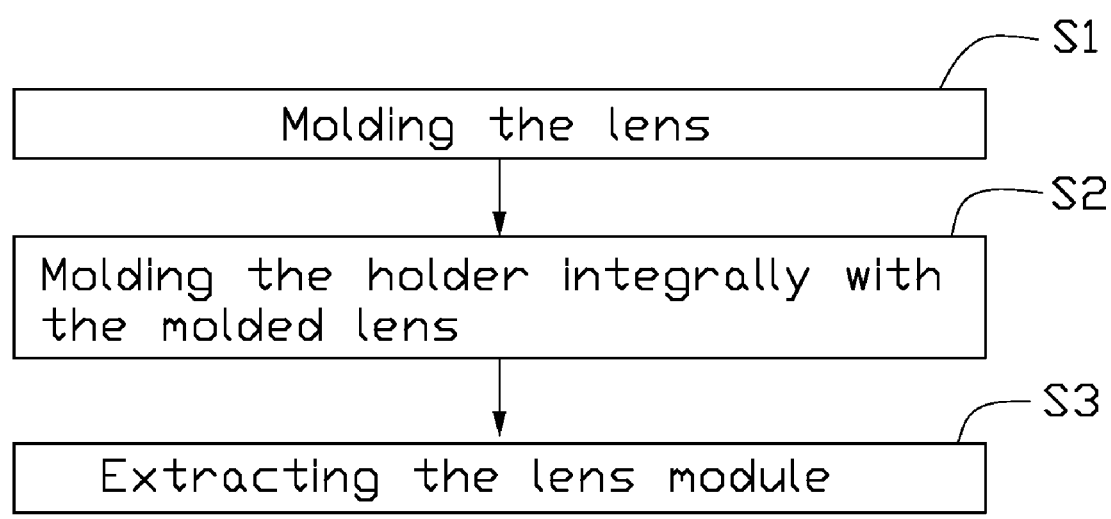
FIG. 3 shows a flow chart, illustrating a method for manufacturing the lens module shown in FIG. 1.

The present lens module and the method for manufacturing the same, as to the embodiments of present invention, are described here in conjunction with the accompanying drawings in FIGS. 1-3. The lens module is usable in an image-capturing device, for example, in a portable electronic device, such as a mobile phone, a digital camera, etc., or in a film-based camera device.

Referring to FIG. 1, a lens module 100 is shown, in accordance with a present embodiment. The lens module 100 includes a holder 10, a flash lamp lens 20, and a camera lens unit (not shown). The camera lens unit (e.g., one or more lenses) is held by/within the holder 10. The flash lamp lens 20 is integrally manufactured with the holder 10 as a single, whole piece by means of a method, as illustrated in FIG. 3.

The holder 10 includes a body portion 12, an ear portion 14, a first holding portion 16, and a second holding portion 18. The camera lens unit is accommodated and held within the body portion 12. The flash lamp lens 20 is integrated with the ear portion 14 via a molding procedure. The first and second holding portions 16 and 18 are configured (i.e., structured and arranged) to separately secure the holder 10 to/within the image-capturing device.

Referring further to FIG. 2, the body portion 12 of the holder 10 is roughly rectangular, which includes an upper wall 122, a bottom wall 123, and four sidewalls 124. The upper wall 122 defines an approximately rectangular recessed portion 126 configured for accommodating and retaining the camera lens unit. As such, the recessed portion 126 is cooperatively formed by the sidewalls 124 and the bottom wall 123 of the body portion 12. The bottom wall 123 further has an opening 127 defined therethrough. The camera lens is mounted through the opening 127. The bottom wall 123 is also formed with a first injecting portion 125 and a second injecting portion 129. As seen from FIG. 1, the first injecting portion 125 is positioned proximate to the ear portion 14 and is further positioned between one sidewall 124 and the opening 127. The second injecting portion 129 is located in connection with one sidewall 124. The first injecting portion 125 is formed, while injecting a first molding material to form the flash lamp lens 20. The second injecting portion 129 is formed, by injecting a second molding material to form the holder 10.

The ear portion 14 of the holder 10 extends from one sidewall 124 of the body portion 12, which is located proximate to the first injecting portion 125. The ear portion 14 includes a top wall 142 and an accommodating portion 144. The accommodating portion 144 is defined through the top wall 142. The flash lamp lens 20, by means of executing the method illustrated in FIG. 3, is formed and incorporated in the accommodating portion 144. The top wall 142 is preferably configured to be coplanar with the upper wall 122 of the body portion 12, thereby promoting a projection of the flash lamp light in a direction generally parallel to the imaging direction.

The first holding portion 16 extends downwardly from the bottom wall 123 of the body portion 12, at a side thereof opposite to the ear portion 14. The first holding portion 16 is roughly rectangular-shaped and includes a first hanging portion 162, a hooked portion 164, and a roughly rectangular receiving cavity 165. The receiving cavity 165 is defined through the first holding portion 16. The first hanging portion 162 has an approximately rectangular shape and is formed downwardly from an interior wall of the first holding portion 16 and is received in the receiving cavity 165. The first hanging portion 162 has a through hole 166 defined therethrough in such manner that the first hanging portion 162 can be hung within the image-capturing device. The hooked portion 164 is, usefully, generally L-shaped and is disposed at a bottom wall 123 of the first hanging portion 162. The hooked portion 164 is configured to hook/attach with the image-capturing device.

Referring back to FIG. 2, the second holding portion 18 extends downwardly from the bottom wall 123 of the body portion 12, like the first holding portion 16, and includes three integral walls (not labeled). Two of the walls of the second holding portion 18 are essentially orthogonal relative to that of the first holding portion 16 and thus parallel to one another, with the third wall thereof being approximately parallel to the first holding portion 16. The second holding portion 18 is generally semi-enclosed with an opening in each respective wall thereof. One such opening, in the form of a roughly rectangular accommodating cavity 181, is directly arranged opposite to the first holding portion 16.

The second holding portion 18 particularly includes the accommodating cavity 181, a second hanging portion 182, and a resisting block 184. The accommodating cavity 181 is defined through the second holding portion 18 and is preferably configured to face toward the receiving cavity 165 of the first holding portion 16. The second hanging portion 182 has an approximately rectangular shape and is formed downwardly from an interior wall of the second holding portion 18 and is accommodated in the accommodating cavity 181. The second hanging portion 182 thus extends in essentially the same direction as the first hanging portion 162. The second hanging portion 182 has a through hole 183 defined therethrough, in such manner that the second hanging portion 182 can be hung within the image-capturing device. The resisting block 184 protrudes outwardly, almost/approximately vertically from an exterior wall of the second hanging portion 182 (i.e., approximately perpendicular to the above-described third wall of the second holding portion 18). The resisting block 184 is disposed adjacent to the accommodating cavity 181. The resisting block 184 has such configuration as to resist the image-capturing device, thus preventing the holder 10 from becoming displaced transversely relative to the image-capturing device.

The flash lamp lens 20 is formed integrally with the ear portion 14 of the holder 10 by executing the corresponding steps of the method illustrated in FIG. 3. As such, the flash lamp lens 20 is formed with essentially the same shape and size as the accommodating portion 144 of the ear portion 14. Thus, the flash lamp lens 20 has an interference fit with the accommodating portion 144 and, if the materials used for the ear portion 14 and the flash lamp lens 20 are sufficiently compatible, the two members also would be effectively plastically welded together, without displaying a weld bead therearound.

Referring further to FIG. 3, the lens module 100 is formed using an injection molding process. The method for manufacturing the lens module 100 includes at least three steps, as follows.

The first step S1 is to inject the first molding material into a provided mold assembly (not shown) so as to mold the flash lamp lens 20 of the lens module 100. The mold assembly is configured to accord/correspond with the lens module 100, so as to integrally mold the holder 10 to the flash lamp lens 20. During this process, the first molding material is injected. Then, the flash lamp lens 20 and the first injection portion 125 of the holder 10 are formed. The first molding material can be any kind of optical material typically used to form the flash lamp lens 20. In this embodiment, the lens module 100 is, usefully, further electroplated. Thus, the first molding material can be certain kinds of materials that cannot be electroplated or that otherwise cannot easily be electroplated, such as PC material (polycarbonate), and so on.

The second step S2 is to inject the second molding material into the mold assembly, so as to mold/form the holder 10 of the lens barrel integrally with the molded flash lamp lens 20. At this stage, the molded flash lamp lens 20 still exists (i.e., is still retained) in the mold assembly. During this process, the second molding material is injected. Then, the holder and the second injection portion of the holder 10 are formed. The second molding material can be any kind of material typically used to form the holder 10. In this embodiment, the holder 10 is, advantageously, further electroplated. Thus, the second molding material can be certain kinds of materials that can be easily electroplated, such as ABS material (Acrylonitrile-Butadiene-Styrene), and so on.

The third step S3 is to extract the completely molded lens module 100 from the mold assembly.

Therefore, the lens module 100 is formed with the flash lamp lens 20 integrally formed with the holder 10. The use of injection molding technology eliminates any need for assembling the flash lamp lens 20 to and/or in the holder 10 and greatly simplifies the manufacturing process of the lens module 100, thus saving time and money. Additionally, the holder 10 and the flash lamp lens 20 of the lens module 100, manufactured by the above method, also display a sufficient connecting strength therebetween.

It is to be understood that the aforementioned method can be used to mount additional flash lamp lenses 20 with respect to the module 100 and/or to mount alterative-use lenses (i.e., other than for a flash lamp) relative to the module 100.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for manufacturing a lens module, the lens module including a lens and a holder integrally formed with the lens, comprising steps of:
   molding the lens by means of injecting a first molding material into a provided mold assembly;
   molding the holder integrally with the molded lens by means of injecting a second molding material into the mold assembly to thereby yield the lens module, the second molding material is being more readily electroplated than the first molding material; and
   extracting the lens module from the mold assembly.

2. The method as claimed in claim 1, wherein the first molding material comprises (Polycarbonate), and the second molding material comprises ABS (Acrylonitrile-Butadiene-Styrene).

3. The method as claimed in claim 1, wherein the lens is a flash lamp lens.

4. A lens module for an image-capturing device, comprising:

a lens, the lens being is made of a first molding material; and a holder formed integrally with the lens, as a whole single piece, the holder being is made of a second moldings material, the first molding material being difficult to electroplate, and the second molding material being easily electroplated.

5. The lens module as claimed in claim 4, wherein the lens is a flash lamp lens.

6. The lens module as claimed in claim 4, wherein the first molding material comprises (Polycarbonate) and the second molding material comprises ABS (Acrylonitrile-Butadiene-Styrene).

7. The lens module as claimed in claim 4, wherein the holder comprises a body portion, an ear portion, a first holding portion, and a second holding portion, the first and second holding portions, respectively, extend downwardly from a bottom wall of the body portion, and the ear portion extends transversely from a side wall of the body portion.

8. The lens module as claimed in claim 7, wherein the ear portion comprises an accommodating portion, and the lens is formed and accommodated in the accommodating portion.

9. The lens module as claimed in claim 7, wherein the holder is molded with the lens.

\* \* \* \* \*